Feb. 12, 1963  W. E. LAMPHEAR  3,077,330
FLUID CONDUIT COUPLING
Filed Sept. 18, 1961  6 Sheets-Sheet 4
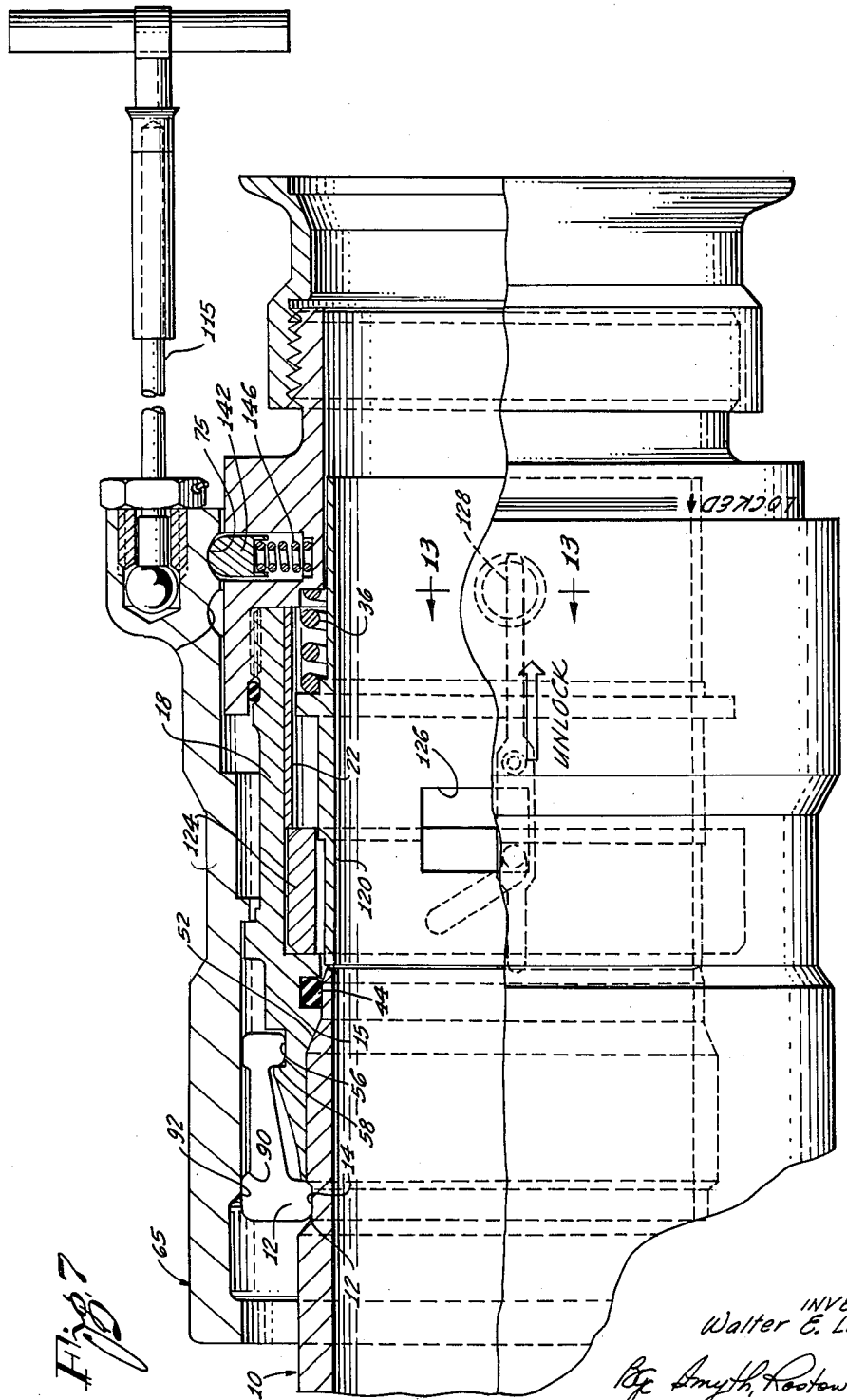
INVENTOR:
Walter E. Lamphear
By Smyth, Roston & Pavitt
Attorneys

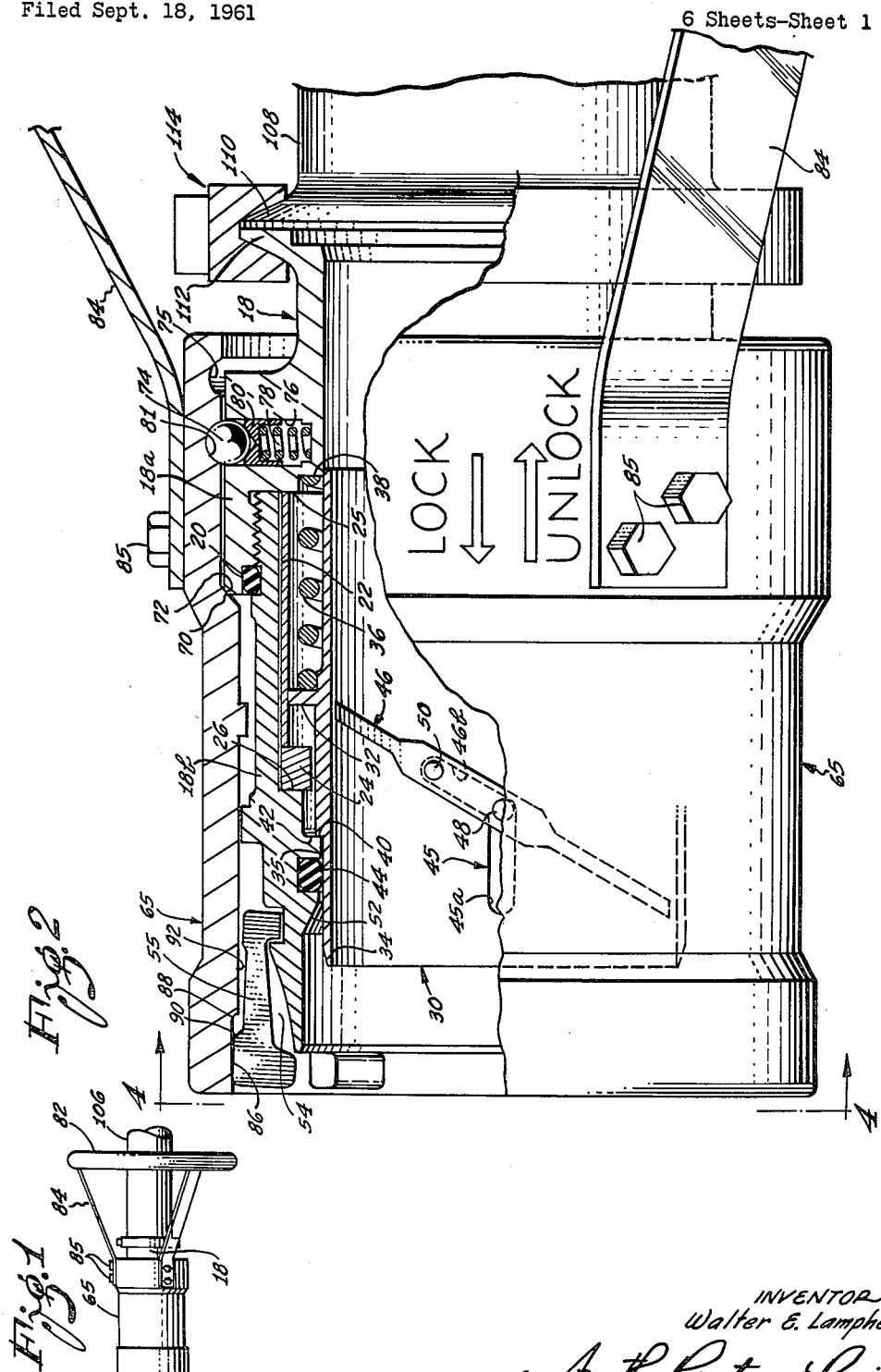

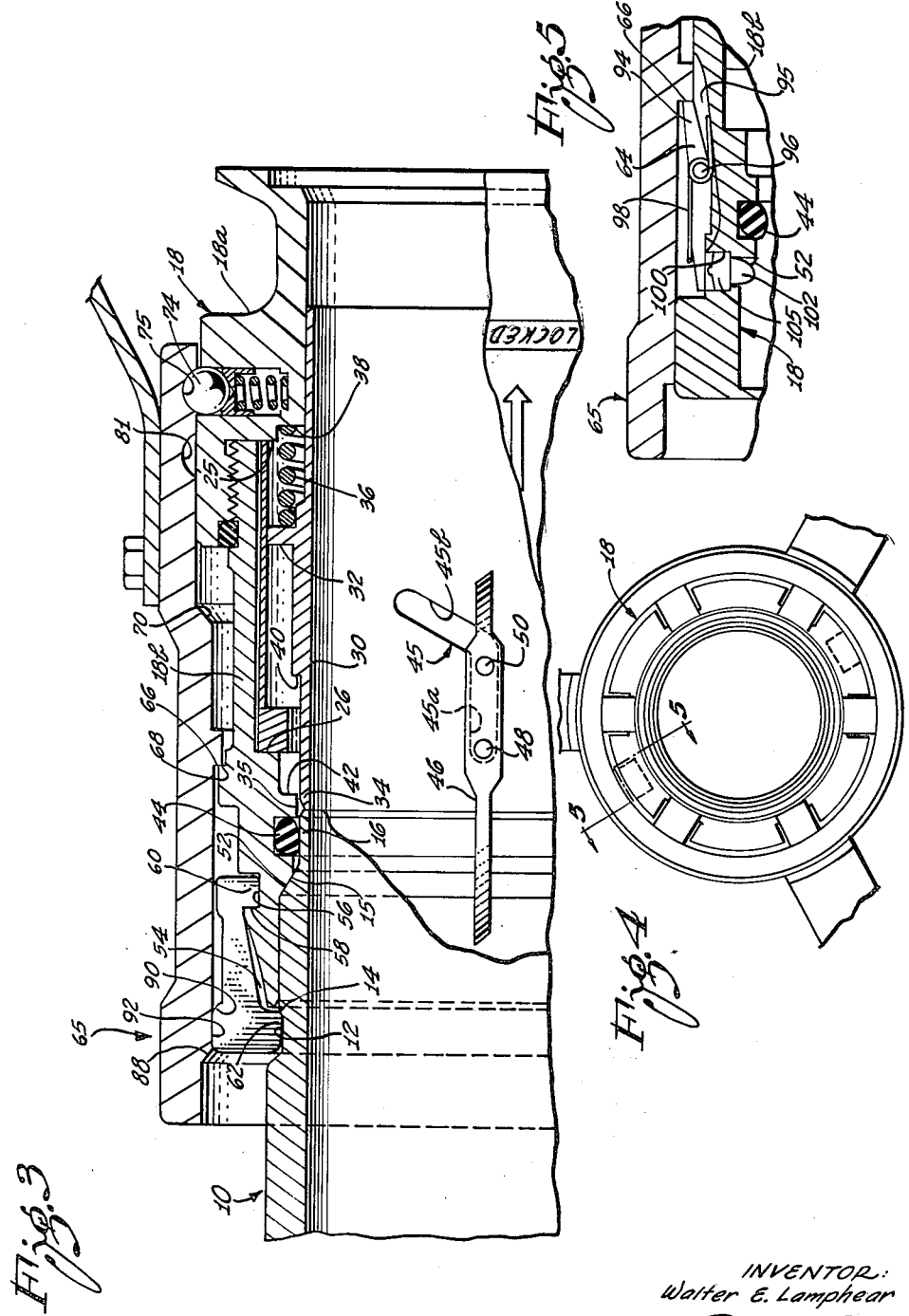

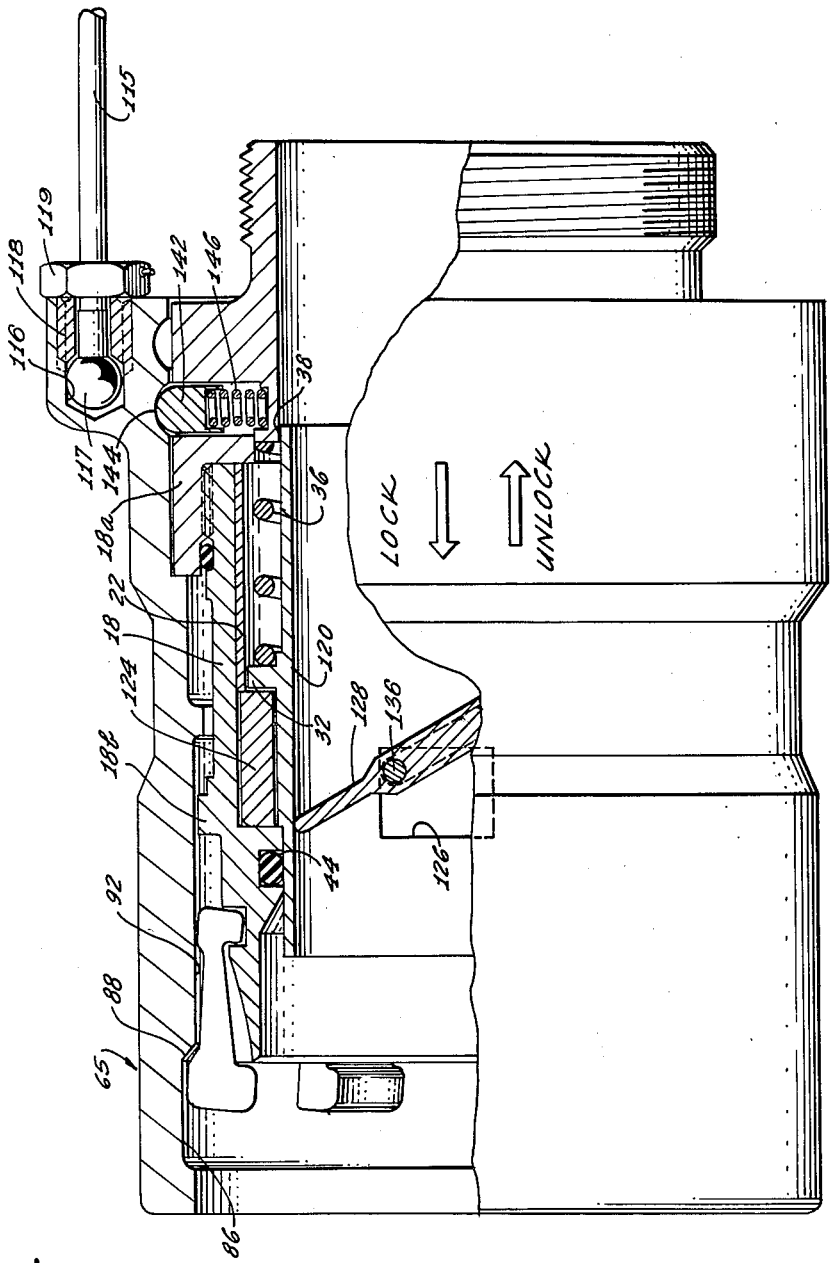

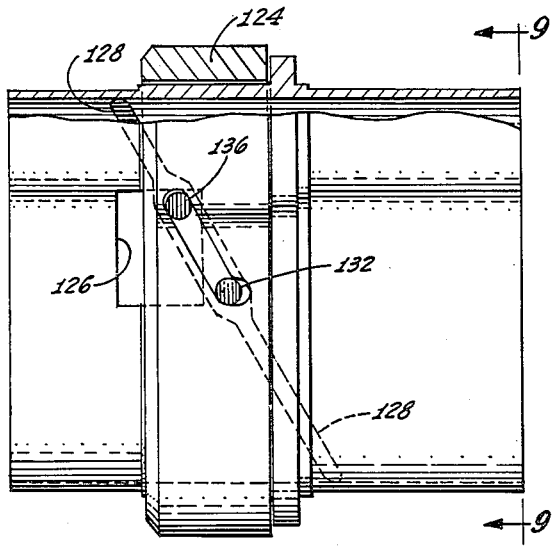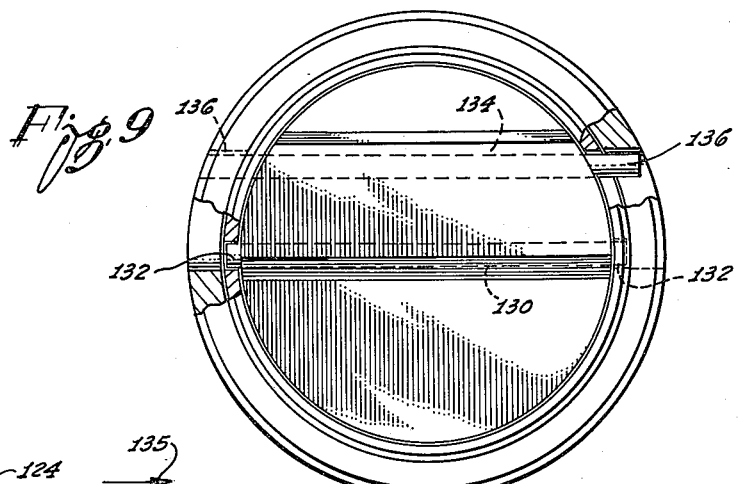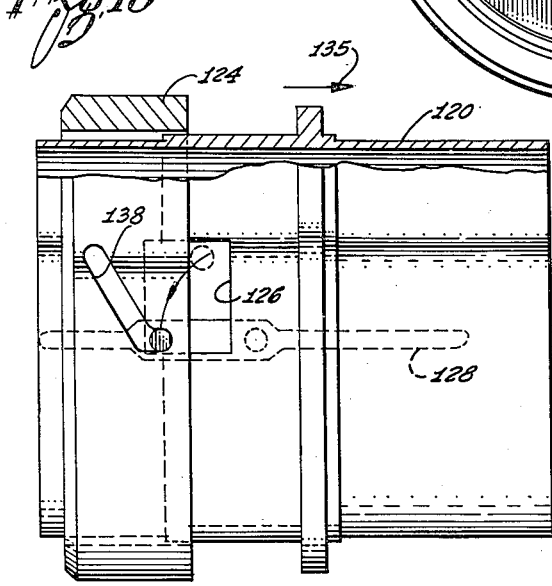
INVENTOR:
Walter E. Lamphear
Attorneys

Feb. 12, 1963 W. E. LAMPHEAR 3,077,330
FLUID CONDUIT COUPLING
Filed Sept. 18, 1961 6 Sheets-Sheet 6
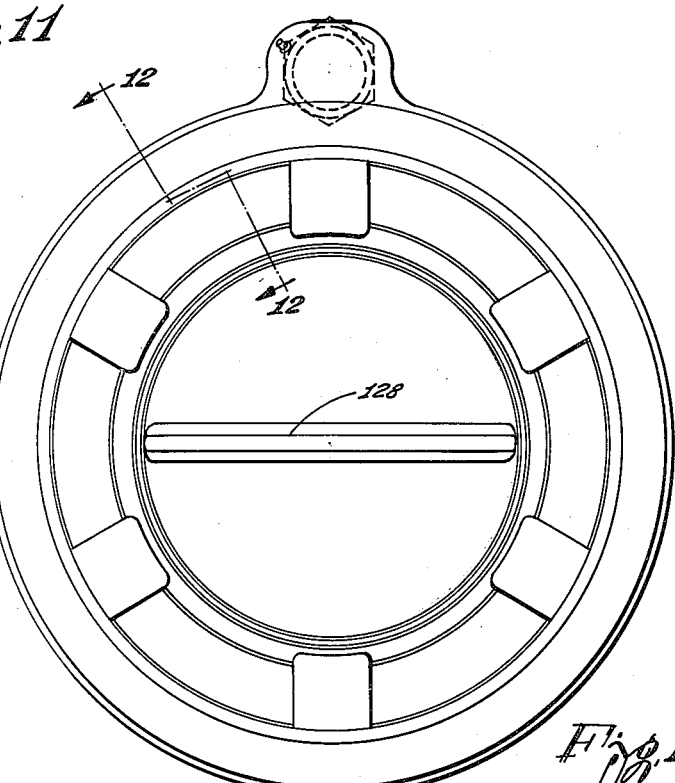
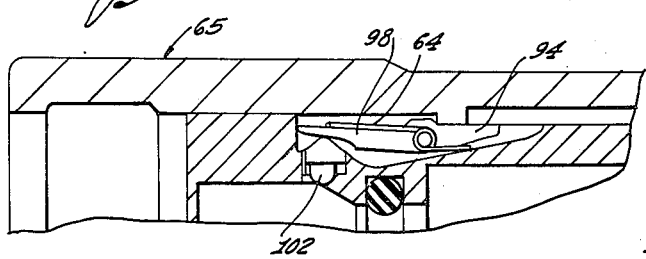
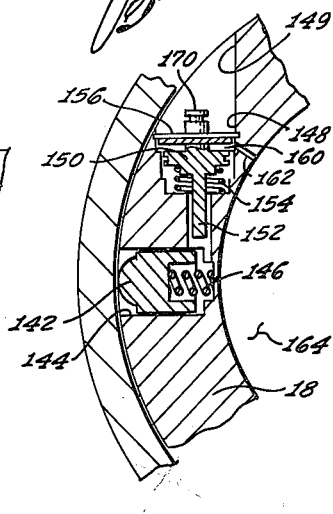
INVENTOR:
Walter E. Lamphear
Attorneys

United States Patent Office 3,077,330
Patented Feb. 12, 1963

3,077,330
FLUID CONDUIT COUPLING
Walter E. Lamphear, Glendale, Calif., assignor to On Mark Couplings, Inc., Los Angeles, Calif., a corporation of California
Filed Sept. 18, 1961, Ser. No. 139,001
21 Claims. (Cl. 251—89.5)

This invention relates to a coupling for interconnecting two fluid passage members.

While the invention has features that make it applicable to various purposes in various fields, as will be apparent to those skilled in the art, the initial embodiment of the invention is directed specifically to the problems and difficulties that arise in connecting a jet engine with a source of compressed air for the purpose of starting the jet engine. This initial embodiment has been selected for the present disclosure and will provide adequate guidance for applying the same principles to other specific purposes. This application is a continuation-in-part of my earlier application, Serial No. 21,422, filed April 11, 1960, and entitled "Fluid Conduit Couplings."

To permit a jet engine to be started by compressed air, the engine is equipped with an air inlet in the form of a coupling body, which coupling body is commonly termed an adapter since it adapts the engine for connection to the compressed air source. A second coupling body is mounted on the end of a flexible hose which is connected to the compressed air source and the second coupling body is commonly termed a socket since it telescopically receives the leading end of the adapter. The supply of compressed air to the flexible hose is controlled by a valve at the source.

For the purpose of interlocking the telescoped coupling bodies, the first coupling body or adapter is formed with a rearwardly facing outer circumferential engagement shoulder and the second coupling body or socket is equipped with engagement means that contracts radially into engagement with this shoulder. An outer actuating sleeve is carried by the socket for movement forward from a normally retracted position to contract the engagement means and to keep the engagement means locked in its contracted state.

One of the problems to which the invention is directed is to avoid kinking of the flexible hose when the two coupling bodies are engaged with each other as well as subsequently when the supply valve is opened to place the hose under pressure. This problem is solved by making the two coupling bodies freely rotatable relative to each other when interconnected. For this purpose, the engagement means on the socket comprises a circumferential series of locking fingers that have wide areas of contact with the engagement shoulder of the adapter. The contraction of these locking fingers by the actuating sleeve stops short of tightly gripping the adapter.

A second problem arises because there is always the possibility that the supply valve will be inadvertently opened when the two coupling bodies are separated from each other or that the two coupling bodies may be inadvertently disconnected while the supply valve is open. In such an event, the hose may whip around in a hazardous manner in reaction to the high velocity escaping airstream.

This second problem is solved by providing the socket or second coupling body with a valve which automatically closes whenever the two coupling bodies are separated. An important feature of the initial embodiment of the invention is the manner in which such a valve is constructed and operated.

The valve is a butterfly type valve which rotates between its open and closed positions about an axis that extends substantially diametrically of the socket. A spring-actuated sleeve is movably mounted inside the socket for retraction by the leading end of the adapter and the valve is operatively connected to this sleeve. This inner valve-actuating sleeve is provided with angular cam slots for operation of the valve in response to axial movement of the sleeve. When the adapter and socket are telescoped together, the inner valve-actuating sleeve is retracted by the adapter to open the valve in opposition to a spring and the spring stores energy for subsequently closing the valve.

A third problem is to so construct such a coupling that it may be quickly and easily connected for the starting of a jet engine. In the usual construction on a coupling of this type, the outer actuating sleeve is normally held at its forward effective position by a spring acting between the outer actuating sleeve and the coupling body or socket on which it is mounted. Ordinarily the procedure for interconnecting the socket and adapter consists in grasping the socket with one hand, retracting the outer actuating sleeve against spring pressure with the other hand, moving the socket into telescoping relation with the adapter while the outer actuating sleeve of the socket is retracted, and then releasing the outer actuating sleeve to cause the two coupling bodies to interlock.

This procedure is awkward and time consuming. A coupling of the present invention for starting a jet engine is so large and heavy, moreover, that it is desirable to use both hands to maneuver the socket into telescoping relation with the adapter and especially so because sufficient manual force must be exerted to overcome the valve spring.

The present invention meets this problem by employing a latch to hold the outer actuating sleeve retracted and by making the latch retractable in response to the relative telescoping movement between the two coupling bodies. Such an arrangement temporarily immobilizes the outer actuating sleeve and thus makes it possible to use the outer actuating sleeve itself as manual means for maneuvering the socket into engagement with the adapter. In the present embodiment of the invention, the outer actuating sleeve is provided with a ring-shaped handle of relatively large diameter. With the outer actuating sleeve latched in its retracted position, the handle is grasped to maneuver the socket into telescoping relation with the adapter.

As the socket reaches the desired telescoping position, the outer actuating sleeve automatically unlatches for forward movement to contract the engagement fingers into engagement with the engagement shoulder of the adapter. At the same time, the inner valve-actuating sleeve of the socket is pushed back by the adapter in opposition to spring pressure to open the valve in the socket. Thereafter the outer actuating sleeve may be yieldingly held at its forward locking position either by some spring means or by suitable detent means. In the present embodiment of the invention, the outer actuating sleeve is held at its forward locking position by detent means and a second detent means is provided to yieldingly hold the outer actuating sleeve in its alternate retracted position.

An alternate embodiment of the invention is illustrated which particularly involves a design accommodating an alternate mode of valve actuation while still meeting all the technical requirements and problems as outlined above. In addition, the alternate embodiment has been provided with a further feature, that is a locking device to insure positive coupling when the unit is in coupled position. The locking arrangement is operatively associated with pressure level within the coupler assembly whereby the locking device becomes actuated upon use, but does not interfere with coupler operation under a non-use condition. This feature adds materially to the safety of the arrangement disclosed, as will be well understood by those skilled in the art.

The features and advantages of the invention may be understood by reference to the following detailed description and the accompanying drawings.

In the drawings, which are to be regarded as merely illustrative:

FIG. 1 is a side elevation on a reduced scale of the coupling with the adapter and socket interconnected for the flow of compressed air therethrough;

FIG. 2 is a view on a larger scale partly in longitudinal section and partly in side elevation showing the construction of the socket separate and apart from the adapter;

FIG. 3 is a similar view showing the socket and adapter interconnected with the valve of the socket open for fluid flow therethrough;

FIG. 4 is an end elevation of the socket on a reduced scale;

FIG. 5 is a fragmentary section on a larger scale taken as indicated by the angular line 5—5 of FIGURE 4 to show the construction of a latch mechanism for releasably holding the outer actuating sleeve in its retracted position;

FIG. 6 is a partially sectional side elevational view, similar to FIGURE 2, of an alternate embodiment of the invention;

FIG. 7 is a side elevational view, partially sectional, of the embodiment of FIGURE 6 and in a coupled position similar to FIGURE 3;

FIG. 8 is a partially sectional fragmentary side elevational detailed view of the central valve arrangement of the embodiment of FIGURE 6;

FIG. 9 is an end elevational view of the structure shown in FIGURE 8;

FIG. 10 is a partially sectional fragmentary side elevational view of the structure shown in FIGURE 8 but illustrating the valve in open position;

FIG. 11 is an end elevational view of the embodiment of FIGURE 6 and similar to the view of FIGURE 4;

FIG. 12 is a sectional view taken along the line 12—12 of FIGURE 11 and showing the latching arrangement in disengaged position; and FIG. 13 is a sectional view taken along the line 13—13 of FIGURE 7.

The first coupling body or adapter on the jet engine may comprise simply a nipple 10 of the configuration shown in FIG. 3. This configuration provides a shallow outer circumferential groove 12 which forms a rearwardly facing outer circumferential locking shoulder 14. Forward of the locking shoulder 14, the adapter is formed with a tapered circumferential shoulder 15 and is further formed with a relatively thin cylinder leading end portion 16.

The second coupling body or socket is generally designated by the numeral 18 and is made in two sections, 18a and 18b. The two sections are screwed together as shown with the joint between the two sections sealed by a suitable O-ring 20. Mounted inside the body section 18b is a cylindrical liner 22 in abutment with an adjacent ring 24. When the two body sections 18a and 18b are tightened by screw action, the liner 22 and the adjacent ring 24 are tightly clamped between a shoulder 25 of the body section 18a and an opposing shoulder 26 of the body section 18b.

An inner valve-actuating sleeve 30 is slidingly mounted inside the socket body 18 for axial movement relative thereto. For this purpose the actuating sleeve may be formed with an outer radial flange 32 for sliding contact with the liner 22, and may be formed with a leading end portion 34 dimensioned for sliding contact with a cylindrical portion 35 of the body section 18b. A suitable coil spring 36 acts in compression between the radial flange 32 and a circumferential shoulder 38 of the socket body 18 to urge the valve-actuating sleeve 30 forward to its normal limit position shown in FIG. 2. At this forward limit position an outer circumferential shoulder 40 of the valve-actuating sleeve abuts an inner circumferential stop shoulder 42 of the socket body 18.

The leading end portion 34 of the valve-actuating sleeve 30 is tapered as shown to slide easily past an O-ring 44 that is mounted in an inner circumferential groove in the previously mentioned cylindrical portion 35 of the socket body. The leading end portion 34 of the valve-actuating sleeve 30 is of substantially the same inside and outside diameter as the leading end portion 16 of the adapter body 10 so that the adapter body causes the valve-actuating sleeve to retract against the opposition of the coil spring 36 when the adapter body is telescoped into the socket body as shown in FIG. 3. The edge of the leading end portion 16 of the adapter body 10 is tapered as shown to make the leading edge pass easily through the previously mentioned O-ring 44.

The valve-actuating sleeve 30 is formed with a pair of opposite slots 45. The two slots 45 are of angular configuration, each having a portion 45a that is parallel to the axis of the sleeve and a second portion 45b that is at an angle to the first portion. A butterfly valve member 46 is mounted inside the valve-actuating sleeve 30 for rotation about a transverse axis and, for this purpose, is provided with a pair of diametrically opposite trunnions 48. The trunnions 48 extend through the portions 45a of the two slots and are journaled in the previously mentioned ring 24.

The butterfly valve member 46 is further provided with a pair of opposite control pins 50 that extend into the inclined portions 45b of the two slots 45, respectively. At the normal closed position of the valve member 46 shown in FIG. 2, the trunnions 48 of the valve member are in the portion 45a of the two slots and the control pins 50 are in the second portion 45b of the two slots. When the valve-actuating sleeve 30 is retracted to the position shown in FIG. 3, the control pins 50 are shifted into the portions 45a of the respective slots 45 to cause the butterfly valve member to take its open position parallel with the axis of the valve-actuating sleeve 30.

The section 18b of the socket body 18 conforms to the configuration of the adapter body 10. Thus, as may be seen in FIG. 3, the body section 18b has an inner circumferential tapered shoulder 52 to mate with the previously mentioned outer circumferential tapered shoulder 15 of the adapter body 10. The adapter body 10 is further formed with a circumferential series of longitudinal grooves 54 to slidingly house corresponding locking fingers 55 in a floating manner. In the construction shown, there are six grooves and six corresponding locking fingers.

Each of the longitudinal grooves 54 opens at its forward end on the forward end or rim of the socket body 18. The rearward end of each of the grooves 54 is intersected by a circumferential groove 56. The circumferential groove 56 forms a retaining shoulder 58 near the inner end of each of the longitudinal grooves 54, and each of the locking fingers 55 is formed at its inner end with a lug 60 which extends into the circumferential groove 56 in engagement with the shoulder 58 to retain the locking finger in its assembled position. Each of the locking fingers 55 is formed at its forward end with a radially inwardly extending lug 62 to seat removably in the previously mentioned circumferential groove 12 of the adapter body 10 in locking engagement with the locking shoulder 14 of the adapter body.

As may be seen in FIG. 4, the locking fingers 55 are of substantial width and of substantial dimension radially of the socket body 18. With the longitudinal sides of the locking fingers 55 parallel, and with the side walls of each of the corresponding longitudinal grooves 54 parallel with a longitudinal radial plane through the axis of the socket body, the locking fingers are free to move radially at their forward ends but are effectively guided throughout their radial movement to eliminate any tendency for the locking fingers to rotate laterally, the substantial width of each locking finger being helpful in this regard.

An outer axially movable actuating means in the form of an outer actuating sleeve 65 slidingly embraces the socket body 18 and is provided with suitable stop means to limit its range of relative axial movement. As shown in FIG. 3, an inner radial shoulder 66 of the actuating sleeve 65 abuts a circumferential stop shoulder 68 of the socket body 18 at the forward limit position of the actuating sleeve. In like manner, a second inner shoulder 70 of the actuating sleeve 65 abuts an inner tapered stop shoulder 72 of the socket body at the rearward limit position of the actuating sleeve as shown in FIG. 2.

In this embodiment of the invention, suitable detent means is provided to releasably engage the outer actuating sleeve 65 at its forward limit position. For this purpose, a circumferential series of detent balls 74 may releasably seat in an inner circumferential detent groove 75 in the actuating sleeve 65. In the construction shown, each detent ball 74 is mounted in a corresponding radial bore 76 in the socket body 18 and is urged radially outward by a small coil spring 78. Preferably, each ball 74 rests against a seat member 80 that is slidingly mounted in the bore 76 and is urged outwardly by the associated coil spring 78. In the preferred practice of the invention, the outer actuating sleeve 65 is further formed with a second inner circumferential latching groove 81 which is engaged by the same detent ball 74 when the actuating sleeve is in its rearward limit position shown in FIG. 2.

The outer actuating sleeve 65 may be grasped for manual shift between its two limit positions. In the present embodiment of the invention, however, a handle in the form of a ring 82 of relatively large diameter is attached to the actuating sleeve 65 in the manner shown in FIG. 1. The handle 82 is carried by a plurality of inclined bars 84, each of which is attached to the actuating sleeve 65 by a pair of cap screws 85.

The outer actuating sleeve 65 overhangs and confines the locking fingers 55 throughout its range of axial movement. When the outer actuating sleeve is in its normal retracted position shown in FIG. 2, the outer ends of the locking fingers 55 are confined by an inner cylindrical surface 86 of the actuating sleeve which confining surface provides adequate radial clearance for the fingers to retract radially outward to release positions clearing the locking shoulder 14 of the adapter body 10. When the outer actuating sleeve 65 is shifted forward from this normal retracted position, a tapered inner circumferential cam shoulder 88 of the actuating sleeve moves against cooperating tapered shoulders 90 of the respective locking fingers 55 to cam the locking fingers radially inward into positions for locking engagement with the locking shoulder 14 of the adapter body. When the outer actuating sleeve 65 reaches its forward limit position, a second inner cylindrical surface 92 of the actuating sleeve confines and locks the locking fingers 55 at their inner locking position as shown in FIG. 3.

As heretofore noted, a feature of the selected embodiment of the invention is the provision of means to latch the outer actuating sleeve 65 in its normal retracted position, the latch means being releasable in response to the relative telescopic movement of the two coupling bodies. Two such latching means are provided at diametrically opposite locations.

FIG. 3 shows how each of the two latch means may be constructed. In FIG. 5 the previously mentioned inner radial shoulder 66 of the outer actuating sleeve 65 serves as a latching shoulder for engagement by one arm of a latch lever 94. The latch lever 94 is mounted in an outer longitudinal groove 95 in the adapter body 18 by means of a transverse pivot pin 96, and is biased towards its latching position by a suitable torque spring 98. The second arm of the latch lever 94 overhangs a radial bore 100 in the socket body 18 in which is mounted a suitable release plunger 102 having a rounded nose on its inner end. The radial bore 100 is countersunk for engagement by an enlarged head 105 of the release plunger at the inner limit position of the release plunger.

The radial bore 100 is located at the previously mentioned tapered inner circumferential shoulder 52 of the socket body 18 for cooperation with the previously mentioned tapered circumferential shoulder 15 of the adapter body 10. When the adapter body 10 reaches its fully telescoped position inside the socket body 18 where the tapered shoulder 15 of the adapter body mates with the tapered shoulder 52 of the socket body, the tapered shoulder 15 cams the release plunger 102 radially outward to disengage the latch lever 94 from the shoulder 66 of the outer actuating sleeve 65 to free the actuating sleeve for forward movement by the handle 28.

The socket body 18 may be mounted on a flexible hose 106 (FIG. 1) in any suitable manner. In the construction shown in FIG. 2, the hose is provided with a metal fitting 108 having a flared rim 110, and the socket body 18 is formed with a corresponding flared rim 112. The two flared rims 110 and 112 are held together in a well-known manner by convergent surfaces of a segmental ring 114, the segments of which may be releasably interconnected in any suitable manner.

The manner in which the invention serves its purpose may be readily understood from the foregoing description. FIG. 2 shows the relative positions of the movable parts of the socket when the socket is separated from the adapter. The valve actuating spring 36 is in its forward position with the butterfly valve member 46 in its closed position. The outer actuating sleeve 65 is in its rearward or retracted position with the detent balls 74 seated in the detent groove 81. The two diametrically opposite latch levers 94 are in engagement with the inner radial shoulder 66 of the outer actuating sleeve 65 to latch the actuating sleeve in its retracted position shown in FIG. 5. The two release plungers 102 protrude into the interior of the socket body 18. The locking fingers 55 are loose with freedom to take their outer radial limit positions.

To connect the compressed air hose 106 to the jet engine, the operator grasps the ring-shaped handle 82 to maneuver the socket body into the desired position in telescoping relation to the adapter body 10. The function of the two diametrically opposite latch levers 94 is to keep the actuating sleeve 65 retracted during this preliminary maneuvering and thus transmit the manual force from the actuating sleeve to the socket body 18 through the latch levers.

During the initial portion of the relative telescoping of the socket and the adapter, the adapter body 10 pushes the valve-actuating sleeve 30 axially inward to cause the butterfly valve member 46 to swing to its open position. As the valve-actuating sleeve 30 is retracted by the adapter body 10, the leading end portion 16 of the adapter slides through the O-ring 44 so that the O-ring may seal the joint between the two coupling bodies.

As the tapered circumferential shoulder 15 of the adapter body 10 reaches abutment with the inner tapered shoulder 52 of the adapter body 18, the tapered shoulder 15 contacts the rounded noses of the two release plungers 102 to cam the plungers outward and thereby rotate the two latch levers 94 out of engagement with the outer actuating sleeve 65. The manual force exerted forwardly by the operator through the medium of the ring handle 82 causes the unlatched outer actuating sleeve 65 to shift to its forward limit position. In the course of the forward shift of the outer actuating sleeve 65, its inner cam shoulder 88 encounters the tapered shoulders 90 of the locking fingers 55 to cam the locking fingers radially inward into engagement with the circumferential locking shoulder 14 of the socket body 10.

The manual forward shift of the outer actuating sleeve 65 continues to the limit position of the actuating sleeve at which its inner cylindrical surface 92 confines the locking fingers 55 in their locking positions. The operator then releases the ring-shaped handle 82, and the engagement of the detent balls 74 with the inner circumferential groove 75 of the outer actuating sleeve thereafter maintains the actuating sleeve at its forward position. Compressed air is then supplied to the flexible hose 106 for delivery to the jet engine.

When the jet engine is started, the coupling may be broken by simply manually retracting the outer actuating sleeve 65 by means of the ring-shaped handle 82. The retraction of the outer actuating sleeve 65 frees the locking fingers 55 for radially outward movement out of engagement with the adapter body 10. When the outer actuating sleeve 65 is fully retracted relative to the socket body 18, the two latch levers 94 again engage the inner radial shoulder 66 of the actuating sleeve and the detent balls 74 again seat in the inner circumferential detent groove 81. The continued manual rearward movement of the outer actuating sleeve 65 with its inner shoulder 70 in abutment against the stop shoulders 72 of the socket body 18 withdraws thte socket body 18 from telescoping relation with the adapter body 10 to permit the spring 36 to return the valve-actuating sleeve 30 to its normal forward position. Thus, the valve-actuating sleeve 30 quickly closes the butterfly valve member 46 when the coupling is opened.

It is apparent that the locking fingers 55 engage the locking shoulder 14 of the adapter 10 in a manner that permits free rotation of the socket body 18 relative to the adapter body 10. The socket rotates freely to relieve quickly any twist in the hose that may cause the hose to kink.

It is also apparent that the valve 46 quickly closes in an automatic manner whenever the socket is separated from the adapter. The automatic closing of the butterfly valve member 46 prevents any hazardous whipping of the disconnected hose 106 in the event that compressed air is inadvertently supplied to the hose while the socket is separate from the adapter.

A feature of the invention is the dual function of the inner valve-actuating sleeve 30. This sleeve not only serves as means to control the butterfly valve but also serves as means to exert thrust against the adapter body to urge the two coupling bodies apart.

Turning attention now to the embodiment of FIGURES 6 through 13, it will be understood that in many particulars the structure here illustrated is identical to that above described relative to the embodiment of FIGURES 1 through 5. Accordingly, identical numerals as heretofore used relative to the embodiment of FIGURES 1 through 5 will again be used to detail identical structure.

Initially it will be understood that the outer actuating sleeve 65 is provided with slightly different arrangement to induce motion thereof. In place of the handle 82 described in relation to the embodiment of FIGURES 1 through 5, we are now provided with a handle 115 which may serve as a means for direct manual actuation of the coupling assembly or may be conventionally connected (not shown) to any suitable mechanical device to induce the motion hereinafter described. The handle 115 is received within an aperture 116 and has a ball 117 mounted on the end thereof. Appropriate packing 118 and locking nut arrangement 119 secures the end of the handle to the outer sleeve 65.

Directing attention to the detailed construction of the arrangement of FIGURE 6, it will be understood that the inner valve actuating sleeve has, in this embodiment, been slightly modified and has been designated by the numeral 120. Again, the sleeve 120 is telescopically received within the main body 18 and is provided with a shoulder 32 whereby the spring 36 may be compressively received within the main body 18 and have its opposed ends in pressure engagement with the shoulder 32 and the shoulder 38 of the body 18. An annular collar 22 is again provided to surround the spring 36 and abut, at its left end, as seen in the figure, an annular ring member here designated 124. The ring member 124 substitutes for the ring member 24 of the earlier embodiment, and if design structure so requires, may be somewhat more elongated than the ring member in the first embodiment. The inner valve actuating sleeve 120 is provided with a window or aperture 126 in approximate vertical alignment with the longitudinal axis of the assembly and extending slightly thereabove as seen in elevational view. The purpose of this aperture 126 will be more clearly understood by referring to FIGURES 8 through 10, which clearly illustrate the aperture 126 and the here employed flapper valve element 128. Specifically, it will be understood that the valve element 128 is provided with a generally centrally located pivot pin 130 which projects from opposed sides of the element 128 to be journally received as at 132, 132 within appropriate openings in the wall of the inner valve-actuating sleeve 120. Additionally, an actuating pin 134 is secured within an appropriate bore within the valve element 128 and in spaced, generally parallel, relation to the pivot 130. The opposed ends of the pin 134 extend outwardly as at 136, 136 of the dimensional confines of the valve element 128 and through the related aperture 126 within the wall of the inner sleeve 120.

Referring now to the ring 124, it will be noted that said ring is provided, on opposed sides thereof, with a cam slot 138, said cam slot being in generally angular relationship with the longitudinal axis of the assembly as seen in side elevational view. Each cam slot 138 is in appropriate alignment with the adjacent aperture 126 formed in the wall of the actuating sleeve 120. Thus it will be understood that the respective pin ends 136 extend through the related apertures 126 and are complementally disposed in the related cam slots 138 formed in the ring 124. Recalling, in the operation of the earlier embodiment, that coupling action initially induces a rightward movement of the inner actuating sleeve 120 relative to the main body element 18, it will be understood by viewing the two positions illustrated in FIGURES 8 and 10 how such motion as indicated by arrow 135, in this embodiment, induces opening of the valve element 128. The ring 124, by virtue of its clamped relationship, together with the annular collar 22 and between the segments 18a and 18b of the main body 18, is, in effect, a fixed part of the main body. Accordingly, the ring 124 remains stationary upon motion of the valve actuating sleeve 120. As the motion of the sleeve 120 continues, the pin ends 136 by virtue of their engagement in the cam slots 138, urge the related valve element 128 to pivot about journals 132 and assume the longitudinally aligned open position of the valve element 128 as shown in FIGURE 10.

Referring now to FIGURE 7, which illustrates the arrangement in coupled position, it will be understood that the coupling action heretofore described in relation to the embodiment of FIGURES 1 through 5 is substantially identical to that of the present embodiment. That is to say, the male body element 10 is again inserted within the body element 18 and initially engages the outer end of the sleeve 120. As a result of this initial engagement, the sleeve 120 is urged to retract against the yielding pressure of spring 36 until a point is reached where the shoulder 52 of the body element 10 engages the projecting pin 102 of the latching mechanism 64. Upon such engagement, the latching mechanism is biased upwardly against the action of the torsion spring 98 to release its latching end 94 from the shoulder 66 of the member 65 (FIGURE 12). Thereafter, continued coupling action by virtue of pressure exerted urges the outer actuating sleeve forwardly until the lug ends of the fingers 12 are lockingly received within the peripheral groove 14 by virtue of the camming action of the surface 92 against the top surface 90 of the fingers 12. It will thus be noted that coupling action and valve opening action is here completed, as in the previous embodiment, by virtue of the single action of the closure motion between the two coupling elements.

Turning to FIGURE 13, it will be noted that the detent means 74, which was described in detail relative to the earlier embodiment, has been slightly modified. In this modification, a detent pin 142 is again received within an aperture 144 formed within the main body 18. Appropriate spring means 146 normally bias the detent 142 upwardly for appropriate engagement with a receiving indentation 75, again as earlier described. However, it will be noted that the main body 18, as shown in FIGURE 13, is provided with a stepped opening 148 which has an area of communication 149 to the outer part of the valve assembly. A piston 150 is disposed within the opening 128 and has an integral locking pin 152 centrally aligned in the aperture 128. A coil spring 154 is disposed within the aperture 128 and compressively interposed between the main body 18 and the underside of the piston 150. In this way, the piston 150 is normally biased outwardly of the opening 128 and into engagement with a sealing cover 156 which closes the opening at that point. A pressure chamber 160 is defined intermediate the cover 156 and the piston 150, said chamber communicating with a small passage 162 which in turn communicates with the internal portion of the valve assembly as at 164. It will thus be understood that when the valve is in the coupled position shown in FIGURE 7, the detent 142 is engaged with the indentation 75 (FIGURE 7) to maintain the outer sleeve 65 in forward or coupled position. Upon a pressure condition within the valve assembly, pressure will be transmitted from the central portion 164 through the passage 162 and into the pressure chamber 160, thereby urging the piston 150 and its carried locking element 152 against the biasing pressure of the spring 154 into engagement with the underside of the detent element 142 and thereby locking the latter in its upper position. When pressure is dissipated within the valve assembly, it will likewise be dissipated within the pressure chamber 160 and the piston 150 will be urged to retract under the biasing action of the spring 154. Thus it will be apparent that the structure just described provides a coupling-lock safety measure to positively avoid accidental coupling break during the transmission of high pressure fluids, such as air, and thereby avoiding any accidental injury to operating personnel which could result from such an accidental break. It will further be noted that the locking feature is, in a sense, self-actuating in that it automatically unlocks when high pressure air transmission is cut off. As a further desirable feature, the piston is provided with a projecting knob 170 which extends through the cover 150 and is accessible via the opening 149. Thus the self-locking feature above described may be manually overridden by pressure on the knob 170 in the event a test circumstance or the like so requires.

My description in specific detail of the selected embodiment of the invention will suggest various changes, substitutions and other departures from my disclosure, within the spirit and scope of the appended claims.

I claim:

1. In a coupling assembly wherein a first coupling body having an outer circumferential locking shoulder telescopes into a second coupling body on the end of a hose, engagement means on the second body to releasably engage said shoulder to connect the second body with the first body with freedom for relative rotation between the two bodies, said engagement means comprising: a series of engagement members pivotally confined in a corresponding series of longitudinally extended slots in said second body respectively, the forward end of each of the engagement members being formed on its radially inner side with a rearwardly facing engagement shoulder to engage said engagement shoulder of the first body; and an actuating sleeve mounted on said second body for movement between a retracted release position and a forward position overhanging the engagement members and confining the forward ends of the engagement members to confine the engagement members in their positions of engagement with said locking shoulder of the first body; and latch means pivotally carried by said second body and engageable with said sleeve to releasably maintain the latter in release position.

2. A combination as set forth in claim 1 in which the side walls of said grooves are substantially parallel to longitudinal planes extending radially from the axis of the second body; in which each of said slots is formed with a rearwardly facing shoulder; and in which each of said engagement means has a rearward portion pivotally engaging said shoulder.

3. In a coupling wherein a first coupling body having a circumferential locking shoulder telescopes into a second annularly walled coupling body with engagement means on the second body radially contractible into engagement with said locking shoulder to interconnect the two bodies and with an actuating sleeve exposed on the second body to serve as means for manually maneuvering the second body, said sleeve being movable forward from a retracted release position to a position overhanging said engagement means and confining the engagement means in its radially contracted state, means to releasably hold said actuating sleeve at its retracted position during the manual maneuvering of the second body, said holding means comprising: an inner forwardly facing latch shoulder on said actuating sleeve; a latch member movably mounted on said second body for releasable engagement with said latch shoulder at the retracted position of the actuating sleeve; yielding means to urge said latch member to its engagement position; and release means extending through the wall of said second body into the interior of the second body into the path of relative telescoping movement of the first body to release said latch member from said latch shoulder in opposition to said yielding means in response to the relative telescoping movement of the first body into the second body.

4. In a coupling wherein a first coupling body having a circumferential locking shoulder telescopes into an annularly walled second coupling body with engagement means on the second body radially contractible into engagement with said locking shoulder to interconnect the two bodies and with an actuating sleeve exposed on the second body to serve as means for manually maneuvering the second body, said sleeve being movable forward from a retracted release position to a position overhanging said engagement means and confining the engagement means in its radially contracted state, means to releasably hold said actuating sleeve at its retracted position during the manual maneuvering of the second body, said holding means comprising: an inner forward facing latch shoulder on said actuating sleeve, a latch member movably mounted on said second body for releasable engagement with said latch shoulder at the retracted position of the actuating sleeve; yielding means to urge said latch member to its engagement position; release means extending through the wall of said second body into the interior of the second body into the path of relative telescoping movement of the first body to release said latch member from said latch shoulder in opposition to said yielding means in response to the relative telescoping movement of the first body into the second body; and detent means effective between said second body and said actuating sleeve to releasably retain said actuating sleeve at at least one of its two positions.

5. A combination as set forth in claim 4 which said detent means releasably retains the actuating sleeve at its forward position.

6. In a coupling of the character described, the combination of: a first coupling body having a circumferential locking shoulder; a second coupling body to telescope over a leading portion of said first coupling body; engagement means on the second body radially contractible into engagement with said locking shoulder to interconnect the telescoped bodies; actuating means on said second body manually movable forward from a retracted release position to contract said engagement means; handle means carried by said actuating means for manually maneuvering said second body into telescoped relation with said second body; and means to latch said actuating means at its retracted position thereby to transmit forward manual force from said actuating means to the second body; said latch means being responsive to the relative telescoping movement of said first body to release when the two bodies telescope together.

7. A combination as set forth in claim 6 which includes detent means to yieldingly retain the actuating means at a forward position and thereby lock said engagement means in its contracted state.

8. In a coupling assembly, a first coupling body having an annular longitudinally extending main member, a sleeve member having a longitudinal opening therethrough telescopically received within the main member and movable therein relative thereto, spring means compressively interposed between the members to normally bias said sleeve member to an uncoupled forward position relative to said main member, an actuating section carried by the main member radially outwardly thereof and for relative movement therebetween, means carried by the main member to lock the section relative to said main member in a first uncoupled position, coupling latch means radially movable in response to relative movement between the main member and section from said first uncoupled position to a second coupled position, and a second coupling body arranged to initially engage said sleeve and thereafter unlock said locking means to accommodate coupling of said first body to said second body by relative movement therebetween.

9. A coupling assembly according to claim 8, and including a valve element pivotally carried by one of said members within said opening, and cooperating means operatively connecting the valve element to the other of said members to open and close said valve element in response to relative movement between the members.

10. A coupling assembly according to claim 8, wherein said latch means comprises a plurality of fingers pivotally carried by one end of said main member and having latching lugs overlying the end of said main member, and cam means operatively interconnecting the fingers and actuating section to induce radial inward movement of said lugs upon said relative movement between the main member and said section to said second coupled position, and receiving means on said second body to engage said lugs.

11. A coupling assembly according to claim 8, and including detent means carried by the main member and engageable with said actuating section upon said relative movement between the main member and section to said coupled position.

12. A coupling assembly according to claim 9, wherein said latch means comprises a plurality of fingers pivotally carried at one end by the main member and having latching lugs overlying the end of said main member, cam means operatively interconnecting the actuating section and fingers to induce radial inward movement of said lugs upon relative movement between the main member and section to said second coupled position, and receiving means on said second body engaging said lugs.

13. A coupling assembly according to claim 9, and including detent means carried by the main member and engageable with said actuating section upon said relative movement between the main member and section to said coupled position.

14. A coupling assembly according to claim 9, wherein said valve element is pivotally connected to the main member and said cooperating means comprises a pin and cam slot connection between the valve element and the actuating member.

15. A coupling assembly according to claim 14, wherein said actuating member is provided with a slot having a first length aligned with the longitudinal axis of the assembly as seen in elevational view and a second length in angular relation to said axis as seen in elevational view, said valve element having a pivot pin extending through the first length of said slot to pivotally engage the main member, said pin and cam slot connection comprising a second pin on the valve element and extending within the second length of said slot.

16. A coupling assembly according to claim 9, wherein said valve element is pivotally connected to the actuating member and said cooperating means comprises a pin and cam slot connection between the valve element and main member.

17. A coupling assembly according to claim 16, wherein said actuating member is provided with an aperture therein, said main member having a cam slot formed therein in general alignment with the aperture and in angular relation to the longitudinal axis of the assembly as seen in elevational view, said pin and cam slot connection comprising a pin in the valve element extending through said aperture and disposed within the cam slot in said main member.

18. A coupling assembly according to claim 10, wherein said receiving means comprises an annular ledge on said second body, said ledge being longitudinally side-engaged by said lugs.

19. A coupling assembly according to claim 11, and including pressure lock means operatively associated with said detent means and comprising a piston movably carried by said main member for engagement with said detent means to inhibit radial inward movement of said detent means, a spring element interposed between the piston and the main member to normally bias said piston away from said detent means, cover means secured to the main member and defining with the piston a pressure chamber, said main member having a passage therein establishing communication between the opening and said chamber to accommodate pressure transmission to the chamber whereby the piston is urged to engage said detent means.

20. In a coupling member, an annular main tube, an actuating tube telescopically disposed within the main tube and having a longitudinal opening therethrough, spring means compressively interposed by the main tube and the actuating tube to normally bias the actuating tube to a first forward position, an annular coupling member surrounding the main tube and mounted thereon for relative movement therebetween, a plurality of longitudinally extending coupling fingers having latching lugs thereon pivotally carried by the main tube, cam means operatively connecting the fingers and the annular member whereby upon relative movement between the main tube and the annular member to a coupled position the fingers are urged to move radially inwardly, locking means carried by the main tube and normally biased into locking engagement with the annular member to maintain the latter in an uncoupled position, and spring-loaded detent means carried by the main tube and operative to maintain the annular member in a coupled position upon forward movement of the annular member relative to said main tube.

21. In a fluid pressure transmitting coupling structure, a tubular main member, a tubular actuating member telescopically disposed within the main member and movable relative thereto, spring means compressively interposed between the tubular member and the actuating member to normally bias the latter to a forward uncoupled position, an annular sleeve surrounding the main member and mounted thereon for relative movement therebetween, a valve element disposed within said actuating member and pivotally connected to one of the members in alignment with the longitudinal axis of the assembly as seen in elevational view, a plurality of latching fingers having their inner end pivotally mounted to the main member and outer latching lugs overlying an adjacent end of the main member, cam means operatively interconnecting the fingers and the annular sleeve whereby upon forward movement of the annular sleeve relative to the main member to a coupled position the fingers are biased radially inwardly, a cam slot formed in one of the members, a pin connection between said cam slot and said valve element whereby upon relative movement between the main member and the sleeve in a direction to compress said spring means said valve element is urged to an open position, detent means operatively between the main member and sleeve to latch the sleeve in a coupled position upon forward movement of the sleeve relative to the main member, and detent lock means comprising a pressure actuable piston assembly engageable with said detent means to lock the sleeve in coupled position.

References Cited in the file of this patent

UNITED STATES PATENTS

| | | |
|---|---|---|
| 2,255,593 | Berger et al. | Sept. 9, 1941 |
| 2,279,146 | Schneller | Apr. 7, 1942 |
| 2,386,270 | Samiran | Oct. 9, 1945 |
| 2,425,500 | Wiggins | Aug. 12, 1947 |
| 2,599,935 | Pasker | June 10, 1952 |
| 2,727,528 | Dupuy | Dec. 20, 1955 |
| 2,739,827 | Krone et al. | Mar. 27, 1956 |
| 2,824,755 | Lamphear | Feb. 25, 1958 |

FOREIGN PATENTS

| | | |
|---|---|---|
| 847,163 | France | June 26, 1939 |